United States Patent
Geissler et al.

(10) Patent No.: US 11,376,998 B2
(45) Date of Patent: Jul. 5, 2022

(54) FASTENING DEVICE FOR A CHILD'S SEAT IN A MOTOR VEHICLE, AND MOTOR VEHICLE WITH SUCH A FASTENING DEVICE

(71) Applicant: Bayerische Motoren Werke Aktiengesellschaft, Munich (DE)

(72) Inventors: Christian Geissler, Munich (DE); Uemit Kilincsoy, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/955,156

(22) PCT Filed: Oct. 29, 2018

(86) PCT No.: PCT/EP2018/079557
§ 371 (c)(1),
(2) Date: Jun. 18, 2020

(87) PCT Pub. No.: WO2019/120713
PCT Pub. Date: Jun. 27, 2019

(65) Prior Publication Data
US 2020/0384899 A1      Dec. 10, 2020

(30) Foreign Application Priority Data
Dec. 21, 2017  (DE) .................... 10 2017 223 553.5

(51) Int. Cl.
*B60N 2/28* (2006.01)
(52) U.S. Cl.
CPC ......... *B60N 2/2809* (2013.01); *B60N 2/2887* (2013.01)

(58) Field of Classification Search
CPC ........................... B60N 2/2809; B60N 2/2887
See application file for complete search history.

(56) References Cited

U.S. PATENT DOCUMENTS

| 5,810,435 A | 9/1998 | Surot | |
|---|---|---|---|
| 6,729,687 B2 * | 5/2004 | Haverkamp | B60N 2/2887 297/254 |
| 7,165,809 B2 * | 1/2007 | Downey | B60N 2/2809 297/253 |

(Continued)

FOREIGN PATENT DOCUMENTS

| CN | 101920668 A | 12/2010 |
|---|---|---|
| CN | 102712270 A | 10/2012 |

(Continued)

OTHER PUBLICATIONS

International Search Report (PCT/ISA/210) issued in PCT Application No. PCT/EP2018/079557 dated Feb. 6, 2019 with English translation (four (4) pages).

(Continued)

*Primary Examiner* — Philip F Gabler
(74) *Attorney, Agent, or Firm* — Crowell & Moring LLP

(57) ABSTRACT

A fastening apparatus for a child seat on a vehicle seat in a motor vehicle has a fastening element for fastening a child seat holding belt, in particular a top-tether fastening element, and a deflecting element for the child's seat holding belt. The fastening element is arranged in a region of a seating position of the vehicle seat. The fastening element is fastened in front of a front side of a backrest of the vehicle seat.

7 Claims, 1 Drawing Sheet

(56) References Cited

U.S. PATENT DOCUMENTS

| | | | | |
|---|---|---|---|---|
| 7,441,823 | B2* | 10/2008 | Bertoli | B60N 2/2809 |
| | | | | 280/801.1 |
| 7,533,935 | B2* | 5/2009 | Mostert | B60N 2/2809 |
| | | | | 297/254 |
| 7,798,527 | B2* | 9/2010 | Walton | B60R 22/00 |
| | | | | 280/801.1 |
| 9,415,706 | B2* | 8/2016 | Rabeony | B60N 2/2857 |
| 9,802,515 | B2* | 10/2017 | Sammons | B60N 2/28 |
| 2004/0041450 | A1 | 3/2004 | Yamaoka et al. | |
| 2007/0194590 | A1 | 8/2007 | Bertoli et al. | |
| 2010/0314924 | A1 | 12/2010 | Arata et al. | |
| 2012/0049589 | A1 | 3/2012 | Kyugoku et al. | |
| 2013/0015695 | A1 | 1/2013 | Kramm | |

FOREIGN PATENT DOCUMENTS

| | | |
|---|---|---|
| CN | 103201136 A | 7/2013 |
| CN | 204845622 U | 12/2015 |
| DE | 102 13 655 C1 | 7/2003 |
| DE | 10 2004 018 938 A1 | 11/2005 |
| DE | 603 05 110 T2 | 12/2006 |
| DE | 10 2010 010 188 B4 | 11/2011 |
| EP | 0 552 570 A2 | 7/1993 |
| FR | 2 814 994 A1 | 4/2002 |
| FR | 2 974 546 A1 | 11/2012 |
| KR | 10-1562801 B1 | 10/2015 |
| WO | WO 03/008226 A2 | 1/2003 |

OTHER PUBLICATIONS

German-language Written Opinion (PCT/ISA/237) issued in PCT Application No. PCT/EP2018/079557 dated Feb. 6, 2019 (six (6) pages).

German-language Search Report issued in German Application No. 102017223553.5 dated May 17, 2018 with partial English translation (14 pages).

Cover page of EP 1 406 784 A2 published Apr. 21, 2004 (one (1) page).

English translation of Chinese Office Action issued in Chinese Application No. 201880079435.6 dated Dec. 3, 2021 (eight (8) pages).

* cited by examiner

FASTENING DEVICE FOR A CHILD'S SEAT IN A MOTOR VEHICLE, AND MOTOR VEHICLE WITH SUCH A FASTENING DEVICE

BACKGROUND AND SUMMARY OF THE INVENTION

The present invention relates to a fastening apparatus for a child's seat in a motor vehicle, and to a motor vehicle with a fastening apparatus of this type.

DE 10 2010 010 188 B4 has disclosed a motor vehicle seat with a seat part and a backrest, which motor vehicle seat has holding elements for fastening a child's seat. The holding elements for fastening the child's seat are configured in accordance with what is known as the ISOFIX Standard. In particular, the motor vehicle seat has two ISOFIX brackets between the seat part and the backrest, which brackets can be connected to corresponding connecting parts of the mounted child's seat. Furthermore, the child's seat has a holding belt (strap) which is known as a top tether. The holding belt is fastened on the upper region of the child's seat and is pulled from said position in the mounted state of the child's seat upward over the upper edge of the backrest of the vehicle seat and is guided downward on the rear side of the backrest, where it is hooked on a fastening element on a rear side of the backrest of the motor vehicle seat.

In order to mount the child's seat, it is accordingly necessary that the person carrying out the mounting operation hooks the holding belt on the rear side of the backrest. This is uncomfortable for the person carrying out the mounting operation. In addition, it is necessary to this end that the rear side of the backrest is accessible.

It is the object of the present invention to provide a fastening apparatus for a child's seat in a motor vehicle, and a motor vehicle with a fastening apparatus of this type, the fastening apparatus making comfortable fastening of the child's seat by way of a child's seat holding belt, in particular a top tether, possible.

This object is achieved by way of a fastening apparatus for a child's seat in a motor vehicle, and by way of a motor vehicle having such a fastening apparatus, in accordance with the claimed invention.

A fastening apparatus according to the invention for a child's seat on a vehicle seat in a motor vehicle has a fastening element for fastening a child's seat holding belt, in particular a top tether fastening element, and a deflection element for the child's seat holding belt. The fastening element is arranged in a region of a seating area of the vehicle seat. Furthermore, the fastening element is fastened in front of a front side of a backrest of the vehicle seat.

An arrangement of the fastening element in front of a front side of the backrest means that the fastening element is arranged in front of the backrest in the driving direction or seating direction. Accordingly, the fastening element is not arranged on the rear side or in the region of the backrest of the vehicle seat. Furthermore, according to the invention, the fastening element is not fastened to the backrest of the vehicle seat.

In accordance with one preferred development, the fastening element is arranged in a region next to the seating area of the vehicle seat.

The region next to the seating area of the vehicle seat is accessible in a particularly simple and comfortable manner for a user who is mounting the child's seat. Furthermore, the region next to the seating area of the motor vehicle seat is not encroached on with regard to accessibility by way of the child's seat which is arranged on the seating area.

The fastening element is preferably arranged in a region between two seating areas. Here, two fastening elements can be arranged next to one another, with the result that a child's seat can be mounted on the two seating areas, and the associated child's seat holding belt can be hooked on the associated fastening element in the region between the two seating areas.

In accordance with one preferred development of the invention, the fastening element is connected indirectly or directly to a vehicle body of the motor vehicle or is fastened indirectly or directly to the vehicle body of the motor vehicle.

The fastening element is preferably fastened to a vehicle seat frame, that is to say a seat frame of the seat part, and accordingly not to a backrest frame of the backrest. The vehicle seat is in turn fastened to a floor structure of the motor vehicle.

As an alternative, the fastening element can also be fastened directly to the floor structure of the vehicle body. For example, the fastening element can be fastened to a floor panel, in particular a rear floor panel, or a seat crossmember or a central tunnel and the like.

In accordance with one preferred development, the deflection element is arranged in a region of an upper end of the backrest of the vehicle seat.

Here, the deflection element can be attached or fastened to a vehicle body element of the motor vehicle, for example a vehicle body crossmember in the region of what is known as a parcel shelf. Vehicle body crossmembers of this type are usually present in motor vehicles of the limousine type, the coupe type and the cabriolet type. The deflection element might also be attached, however, to a lateral vehicle body element, such as a vehicle body pillar, for example what is known as a C-pillar.

Secondly, the deflection element can be attached or fastened to a backrest frame of the backrest of the vehicle seat. This is advantageous, in particular, when the motor vehicle does not have a vehicle body crossmember in a region, in which what is known as a parcel shelf is usually situated in the case of many motor vehicles. This is frequently the case in motor vehicles of the fastback and hatchback type.

Furthermore, the deflection element can be configured by way of a headrest of the vehicle seat. For example, the deflection element can be configured by way of a headrest pole of the headrest.

In contrast, it is advantageous that no additional part is required, since there is usually a headrest or headrest pole on a motor vehicle seat. Furthermore, the headrest or the headrest pole is designed for loads which correspond at least to the load which can act as a result of a child's seat with a child seated on it in the case of a collision of the motor vehicle.

In accordance with one preferred development of the present invention, the vehicle seat is a vehicle seat bench, in particular a vehicle rear seat bench, with at least two seating areas.

In accordance with one preferred development, the fastening apparatus configures an ISOFIX child's seat fastening system. Accordingly, the child's seat holding belt is a top tether in accordance with the ISOFIX Standard. Furthermore, the fastening element is accordingly a top tether fastening bracket.

Furthermore, the invention relates to a motor vehicle which has a fastening apparatus of this type according to the invention for a child's seat on a vehicle seat. The motor vehicle is preferably a passenger motor vehicle. The invention is particularly advantageous in the case of motor vehicles, in the case of which a rear side of the vehicle seat is not accessible or is accessible at least with difficulty owing to the design. For example, the invention can advantageously be implemented in the case of a motor vehicle of the limousine type, the coupe type and the cabriolet type.

A further aspect of the invention is a system consisting of a motor vehicle with a fastening apparatus as described above, and of a child's seat with a child's seat holding belt.

Abovementioned developments of the invention can be combined with one another in any desired way if possible and appropriate.

A brief description of the figures follows.

DETAILED DESCRIPTION OF THE DRAWINGS

A detailed description of one exemplary embodiment of the invention follows with reference to the figures.

Figure 1:
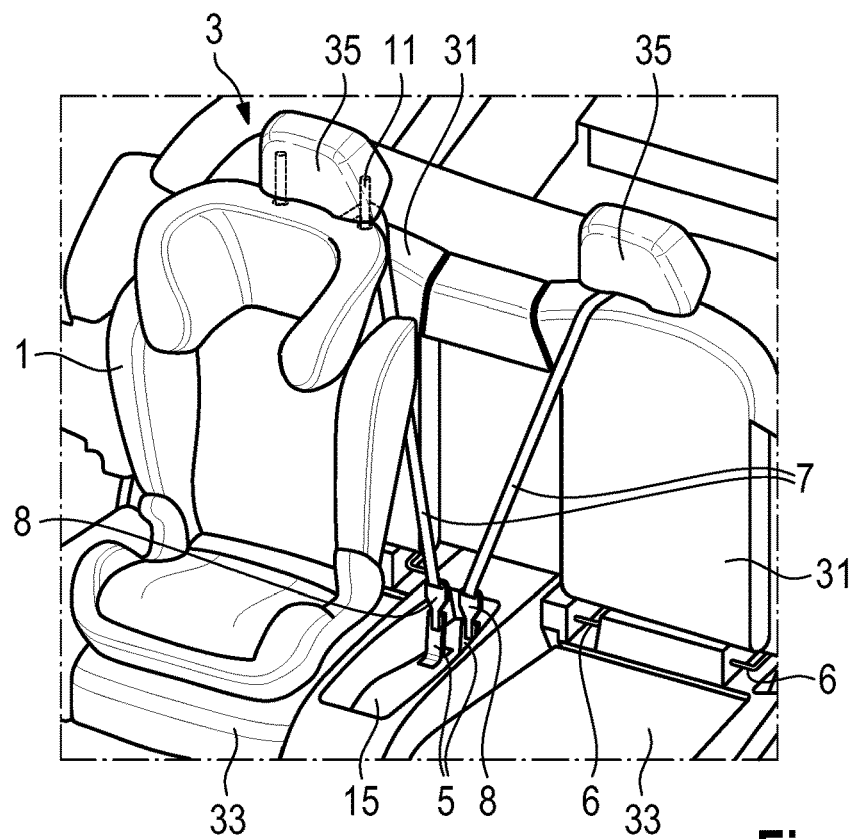
FIG. 1 is a perspective view of a vehicle seat bench with a fastening apparatus and a child's seat in accordance with one exemplary embodiment of the present invention which is fastened thereto.
Figure 2:
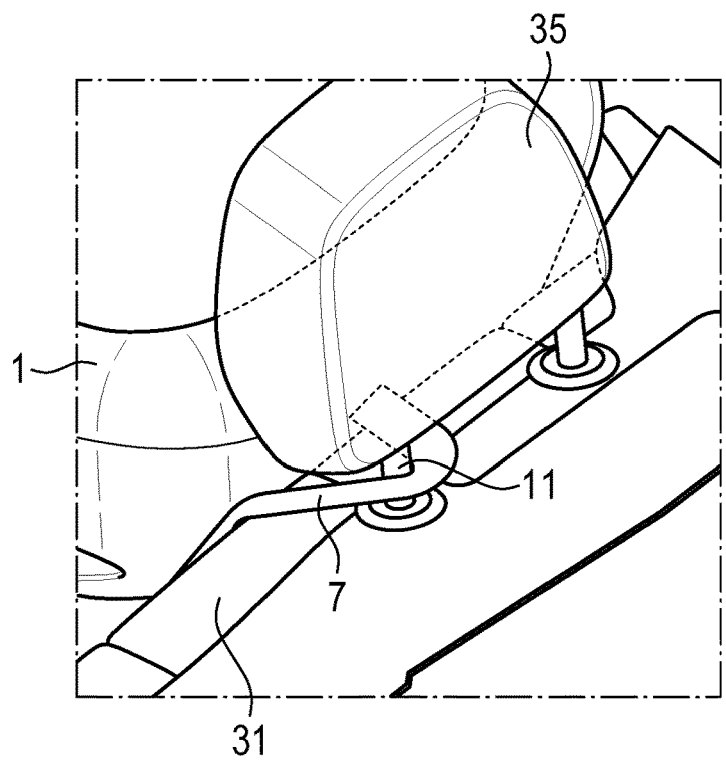
FIG. 2 is a perspective view of a deflection device for a child's seat holding belt in accordance with the exemplary embodiment of the present invention.

As shown in FIG. 1, a passenger motor vehicle in accordance with the exemplary embodiment of the invention has a vehicle seat in the form of a rear seat bench 3 with two seating areas. As shown in FIG. 1, a child's seat 1 is mounted on the right hand seating area. The left hand seating area is also prepared for mounting of a child's seat, the left hand child's seat not being shown in FIG. 1.

The two seating areas have a fastening apparatus for fastening a child's seat in accordance with the ISOFIX Standard. Per seating area, in particular, the fastening apparatus has two ISOFIX holding brackets 6 which are arranged spaced apart from one another in a region between a seating area 33 and a backrest 31. Furthermore, the fastening apparatus has one fastening element 5 per seating area for the attachment of a child's seat holding belt 7. One fastening element 5 for the right hand seating area and one fastening element 5 for the left hand seating area are arranged in a region between the two seating areas in front of the front side of the backrest 31. The fastening elements 5 are fastened in a stable manner directly to a vehicle body floor 15. Each fastening element 5 has an eyelet or the like for fastening a child's seat holding belt 7. In addition, each seating area has a headrest 35, which headrests 35 are connected via in each case two headrest poles 11 to the backrest 31 of the associated seating area. The left hand headrest pole 11 of the right hand headrest 35 and the right hand headrest pole 11 of the left hand headrest 35 serve as deflection elements according to the invention for deflecting the child's seat holding belt 7 for the respective seating area.

The child's seat 1 has connecting elements (not shown) in accordance with the ISOFIX Standard for connecting to the ISOFIX holding brackets 6. Furthermore, the child's seat 1 has the standardized child's seat holding belt 7 which is called a top tether in accordance with the Standard. At its free end, the child's seat holding belt 7 has a corresponding hook element 8 which is configured for engagement with the eyelet of the fastening element 5. The other end of the child's seat holding belt 7 is connected to a rear side of the child's seat 1. The length of the child's seat holding belt 7 is adjustable.

In the case of mounting of the child's seat 1 on the respective seating area, it is first of all connected to the ISOFIX holding brackets 6. Then, the child's seat holding belt 7 is guided from the rear side of the child's seat 1 upward to the backrest upper edge of the seat bench and is pulled through the opening which is configured by way of the backrest upper edge, the two headrest poles 11 and the headrest 35. Then, the child's seat holding belt 7 is placed around the corresponding headrest pole 11 which is configured as a deflection element, and is guided downward again on the front side of the backrest 31. Finally, the hook element 8 of the child's seat holding belt 7 is hooked on the fastening element 5. Finally, the user has to tension the child's seat holding belt 7.

In accordance with the exemplary embodiment, the hooking in of the child's seat holding belt 7 with the hook element 8 can be carried out in an extremely comfortable manner for a user as a result of the arrangement of the fastening element 5 directly next to the associated seating area element 33 in front of the backrest 31. It is not necessary to hook in the child's seat holding belt 7 at a location behind the backrest 31, which location is possibly very difficult to access. The headrest pole 11 which is configured as a deflection element is likewise very easy to access for the user. Overall, the child's seat 1 with the ISOFIX fastening system can be mounted in the motor vehicle rapidly and simply.

The child's seat 1 which is fastened in this way is therefore fixed securely on the seating area of the rear seat bench 3. In particular, tilting forward of the child's seat 1 in the case of a collision can be prevented by way of the child's seat holding belt 7 which is tensioned over the headrest pole 11 which is configured as a deflection element. The headrest pole 11 which is configured as a deflection element can withstand and absorb the corresponding loads in the case of a collision.

In accordance with one exemplary embodiment which is not shown, the deflection element can also be configured by way of a part which is independent from the headrest pole 11. To this end, for example, a corresponding deflection bracket can be fastened to the backrest in the region of a backrest upper edge. As an alternative, a deflection bracket of this type can also be fastened to a vehicle body cross-member which is arranged at the level of the backrest upper edge behind the backrest.

What is claimed is:

1. A fastening apparatus for a child seat on a vehicle seat in a motor vehicle, comprising:
   a child seat holding belt of the child seat;
   a fastening element for fastening the child seat holding belt;
   and a deflection element for the child seat holding belt, wherein
   the fastening element is arranged in a region of a seating area of the vehicle seat,
   the fastening element being fastened in front of a front side of a backrest of the vehicle seat,
   the deflection element is arranged in a region of an upper end of the backrest of the vehicle seat,
   and the deflection element is a headrest pole of a headrest of the vehicle seat, and the child seat holding belt wraps around the headrest pole when fastened to the fastening element.

2. The fastening apparatus according to claim 1, wherein the fastening element is arranged in a region next to the seating area of the vehicle seat in a region between two seating areas.

3. The fastening apparatus according to claim 1, wherein the fastening element is connected indirectly or directly to a vehicle body of the motor vehicle.

4. The fastening apparatus according to claim 3, wherein the fastening element is fastened to the vehicle seat frame or to a floor structure of the vehicle body.

5. The fastening apparatus according to claim 1, wherein the vehicle seat is a vehicle seat bench with at least two seating areas.

6. The fastening apparatus according to claim 1, wherein the fastening apparatus configures an ISOFIX child seat fastening system.

7. A motor vehicle comprising a fastening apparatus for a child seat on a vehicle seat according to claim 1.

* * * * *